(12) United States Patent
Kang et al.

(10) Patent No.: US 6,739,149 B2
(45) Date of Patent: May 25, 2004

(54) AIR CONDITIONER FOR A VEHICLE

(75) Inventors: Sung-Ho Kang, Daejeon-si (KR); Heon-Gu Lee, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 0 days.

(21) Appl. No.: 10/326,119

(22) Filed: Dec. 23, 2002

(65) Prior Publication Data

US 2003/0116303 A1 Jun. 26, 2003

(30) Foreign Application Priority Data

Dec. 21, 2000 (KR) .................................. 2001-0082652

(51) Int. Cl.[7] .............................................. B60H 1/32
(52) U.S. Cl. ............................. 62/244; 165/42; 165/43
(58) Field of Search .......................... 62/239, 244, 186; 454/143, 145, 156, 159, 161; 165/42, 43

(56) References Cited

U.S. PATENT DOCUMENTS

| | | | | |
|---|---|---|---|---|
| 5,934,989 A | * | 8/1999 | Yamamoto | 454/156 |
| 6,016,967 A | * | 1/2000 | Takechi et al. | 237/12.3 |
| 6,148,904 A | * | 11/2000 | Tsunooka et al. | 165/43 |
| 6,261,172 B1 | * | 7/2001 | Shibata | 454/121 |
| 6,311,763 B1 | * | 11/2001 | Uemura et al. | 165/43 |
| 6,351,962 B1 | * | 3/2002 | Mizutani et al. | 62/244 |
| 6,382,518 B1 | * | 5/2002 | Shibata et al. | 237/12.3 B |
| 6,398,638 B1 | * | 6/2002 | Shibata et al. | 454/69 |
| 6,415,857 B1 | * | 7/2002 | Nakamura et al. | 165/204 |
| 6,427,771 B1 | * | 8/2002 | Kako et al. | 165/204 |
| 6,463,998 B1 | * | 10/2002 | Shindo | 165/204 |
| 6,598,670 B1 | * | 7/2003 | Hashimoto et al. | 165/204 |
| 6,599,182 B1 | * | 7/2003 | Schwarz | 454/156 |

FOREIGN PATENT DOCUMENTS

| | | |
|---|---|---|
| JP | 60-008015 | 1/1985 |
| JP | 09-024722 | 1/1997 |
| JP | 09-024723 | 1/1997 |
| JP | 09-156348 | 6/1997 |
| JP | 09-240247 | 9/1997 |
| JP | 10-016539 | 1/1998 |
| JP | 10-338019 | 12/1998 |
| JP | 11-180128 | 7/1999 |
| JP | 11-208238 | 8/1999 |
| JP | 02002362132 A | * 12/2002 |

* cited by examiner

*Primary Examiner*—William E. Tapolcai
*Assistant Examiner*—Mohammad M. Ali
(74) *Attorney, Agent, or Firm*—Lowe Hauptman Gilman & Berner LLP

(57) ABSTRACT

An air conditioner for a vehicle includes a plurality of air paths, an evaporated installed at an entrance of the air paths and a heater core installed at the rear side of the evaporator. A first variable wall in installed between the evaporator and the heater core to separate the air paths into upper and lower portions, or connect the separated air paths, and open or close a heated air path of the heater core. A temp door is installed at the upper portion of the first variable wall to adjust a degree of opening or closing of a cooled air path bypassing the heater core. A second variable wall is installed at the rear side of the heater core to separate the air passing through the heater core into upper and lower portions or connect the separated air paths. The first variable wall and the temp door are independently controlled.

11 Claims, 9 Drawing Sheets

AIR CONDITIONER FOR A VEHICLE

BACKGROUND OF THE INVENTION

1. Field of the Invention

The present invention relates to an air conditioner for a vehicle, and more particularly to an air conditioner for a vehicle in which a variable door is installed at the front and rear sides of an evaporator and heater core so that a moving path of air can be switched.

2. Description of the Related Art

An air conditioner for a vehicle includes a cooling system for cooling the inside of the vehicle and a heating system for heating the inside of the vehicle. The cooling system cools the inside of the vehicle by heat exchange between the evaporator and the external air in the step in which a heat exchange medium discharged by the operation of a compressor circulates to return to the compressor via a condenser, a receiver drier, an expansion valve, and an evaporator. The heating system heats the inside of the vehicle through the heat exchange between the internal/external air and a cooling water in a heater core.

Recently, an air conditioner have been developed in which the external air is supplied to the upper portion of the vehicle and the internal air is supplied to the lower portion, realizing a two layer movement of the internal and external air, so that outer heated air is supplied to window glass through a defrost opening to reduce frost, securing defogging performance, and simultaneously internal heated air is supplied to a leg portion for passengers through a floor opening, improving an inside heating performance of a vehicle.

FIG. 1 shows a conventional air conditioner 10. Referring to the drawing, the air conditioner 10 includes a case 11, an evaporator 12 for cooling air in the case 11, a heater core 13 for heating air in the case 11, a first temp door 14 installed between the evaporator 12 and the heater core 13, a second temp door 15 installed to the rear of the heater core 13, and a plurality of blower fans 16 installed at an entrance of the case 11.

In the operation of the air conditioner 10 having the above structure, the internal air provided by a first blower fan 16a passes through the evaporator 12 and is supplied to the lower portion of the heater core 13 with respect to a partition wall 17. The internal air performs heat exchange at the heater core 13 so as to increase the temperature of the air and is supplied to the inside of a vehicle through a floor opening 111 to heat the inside of the vehicle. The external air provided by a second blower fan 16b passes through the evaporator 12 and is supplied to the upper portion of the heater core 13 with respect to the partition wall 17. The external air performs heat exchange at the heater core 13 and is supplied to window glass through a defrost opening 112, securing a defogging performance.

Here, the partition wall 17 extends from the central rear side of the evaporator 12 toward the central rear side of the heater core 13 and the extended end portion is arranged to direct a vent outlet 113. Since the partition wall 17 is installed between the evaporator 12 and the heater core 13, the internal air and the external air supplied to the inside of a vehicle are prevented from being mixed so that a two layer air flow is formed. However, when the partition wall 17 is fixedly installed at the front and rear sides of the heater core 13, loss of heat due to heat pick up to cold air bypassing the heater core 13 in the maximum cooling mode increases and a large amount of condensed water can be generated on the surface of the case 11 where the cooled air passes.

FIG. 2 shows an air conditioning apparatus 20 for a vehicle disclosed in Japanese Patent Publication No. hei 10-338019. Referring to the drawing, the air conditioning apparatus 20 includes a case 21, an evaporator 22 for cooling air in the case 21, a heater core 23 for heating the air in the case 21, an air door 24 installed between the evaporator 22 and the heater core 23, an auxiliary door 25, and a heated air bypass door 26 installed at an exit of the heater core 23.

In a two layer air flow mode, the air door 24 and the auxiliary door 25 pivot in a direction indicated by a solid line to define a first air path 27 through which the internal air flows and a second air path 28 through which the external air flows. The first air path 27 is connected to a floor opening 211 while the second air path 28 is connected to a defrost opening 213, so that defogging and heating the inside of a vehicle are performed.

However, the air conditioning apparatus 20 requires a space between the end portions of the doors 24 and 25 and the evaporator 22 to secure a pivot space for the air door 24 and the auxiliary door 25. Such space generates a difference in pressure between the upper portion and the lower portion of the case 21, generating a fogging phenomenon. Also, since the air door 24 and the auxiliary door 25 pivot at the same time, an operation range of the air door 24 is restricted and the amount of wind at the exit portion of the evaporator 22 decreases, so that the air door 24 and the auxiliary door 25 are interfered with each other.

SUMMARY OF THE INVENTION

To solve the above and other problems, the present invention provides an air conditioner for a vehicle in which a variable door for supplying a two layer air flow by forming a partition wall selectively between the evaporator and the heater core is installed to simplify a path of air so that loss of heat is minimized.

According to one aspect of the present invention, there is provided an air conditioner for a vehicle comprising a case in which a plurality of air paths separated by a separation wall is formed at an end portion of a body, a defrost opening, a vent opening, and a floor opening are formed to supply the air input through the air paths to areas of the inside of the vehicle, and the defrost opening, the vent opening, and the floor opening are selectively open or closed by doors according to a mode, an evaporator installed at an entrance of the air paths to perform heat exchange to make the air passing through the evaporator in a low temperature state so as to cool the inside of the vehicle, a heater core installed at the rear side of the evaporator to perform heat exchange to make the air passing through the heater core in a hot temperature state so as to heat the inside of the vehicle, a first variable wall installed between the evaporator and the heater core to separate the air paths into upper and lower portions, or connect the separated air paths, and open or close a heated air path of the heater core, a temp door installed at the upper portion of the first variable wall between the evaporator and the heater core to adjust a degree of opening or closing of a cooled air path bypassing the heater core, and a second variable wall installed at the rear side of the heater core to separate the air passing through the heater core into upper and lower portions or connect the separated air paths, wherein the first variable wall and the temp door are independently controlled so that a path of the air passing through the evaporator can be varied.

The first variable wall comprises first and second wall surfaces which are inclined at predetermined angles with respect to a rotation shaft installed between a rear side of the evaporator and a front side of the heater core.

A mode of the first variable wall comprises a mode in which a partition wall is formed to separate the air paths for internal and external air into upper and lower portions between the rear side of the evaporator and the front side of the heater core, and a mode in which the air input along the air paths is prevented from being directly supplied to the heater core and simultaneously guiding the supply.

A floor door is installed at the rear side of the heater core and is opened or closed to control the amount of the hot air passing through the heater core to be discharged through the floor opening.

In a two layer air flow mode, the first and second variable walls are set to rotate approximately parallel to a direction in which air flows and the air paths to the rear side of the evaporator is separated into upper and lower layers.

BRIEF DESCRIPTION OF THE DRAWINGS

The above features of the present invention will become more apparent by describing in detail preferred embodiments thereof with reference to the attached drawings in which.

DETAILED DESCRIPTION OF THE INVENTION

Figure 1:
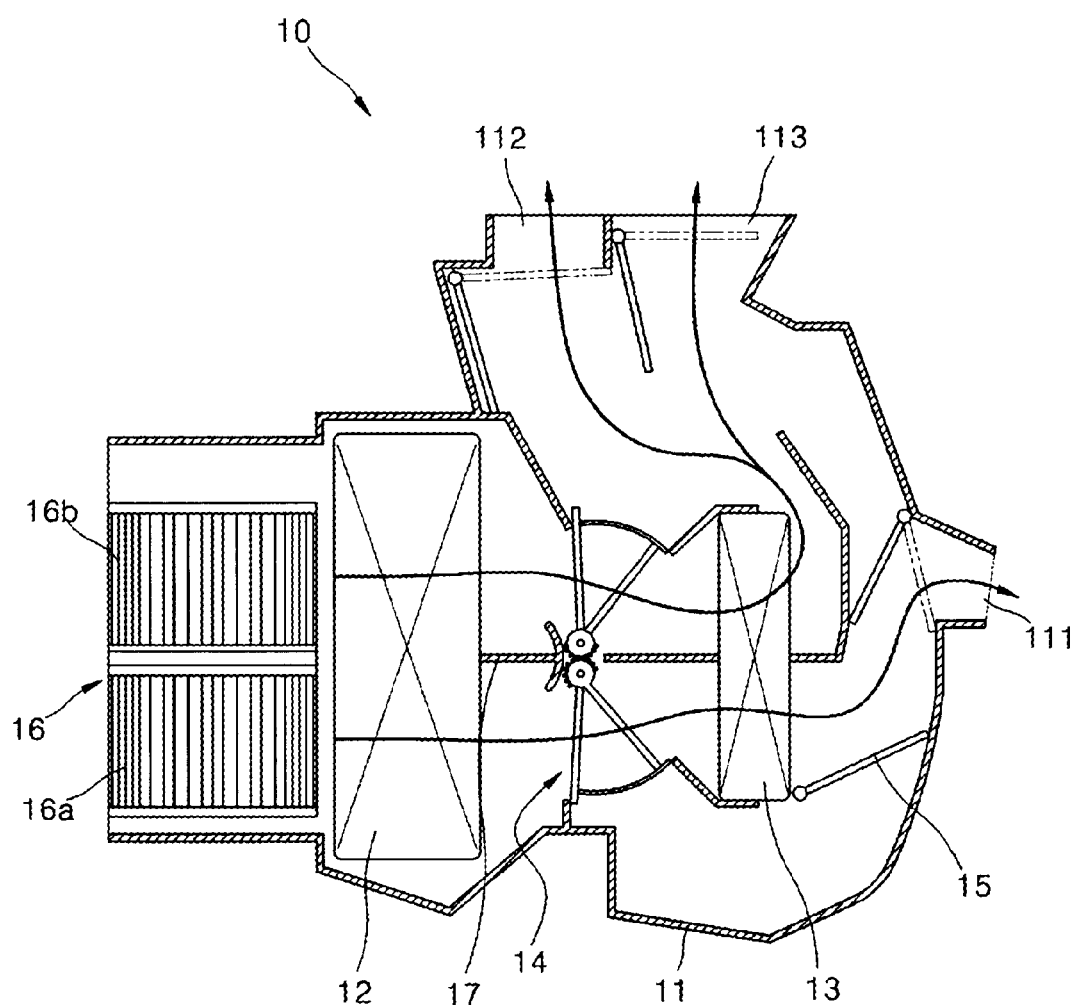
FIG. 1 is a sectional view illustrating a preferred embodiment of a conventional air conditioner.
Figure 2:
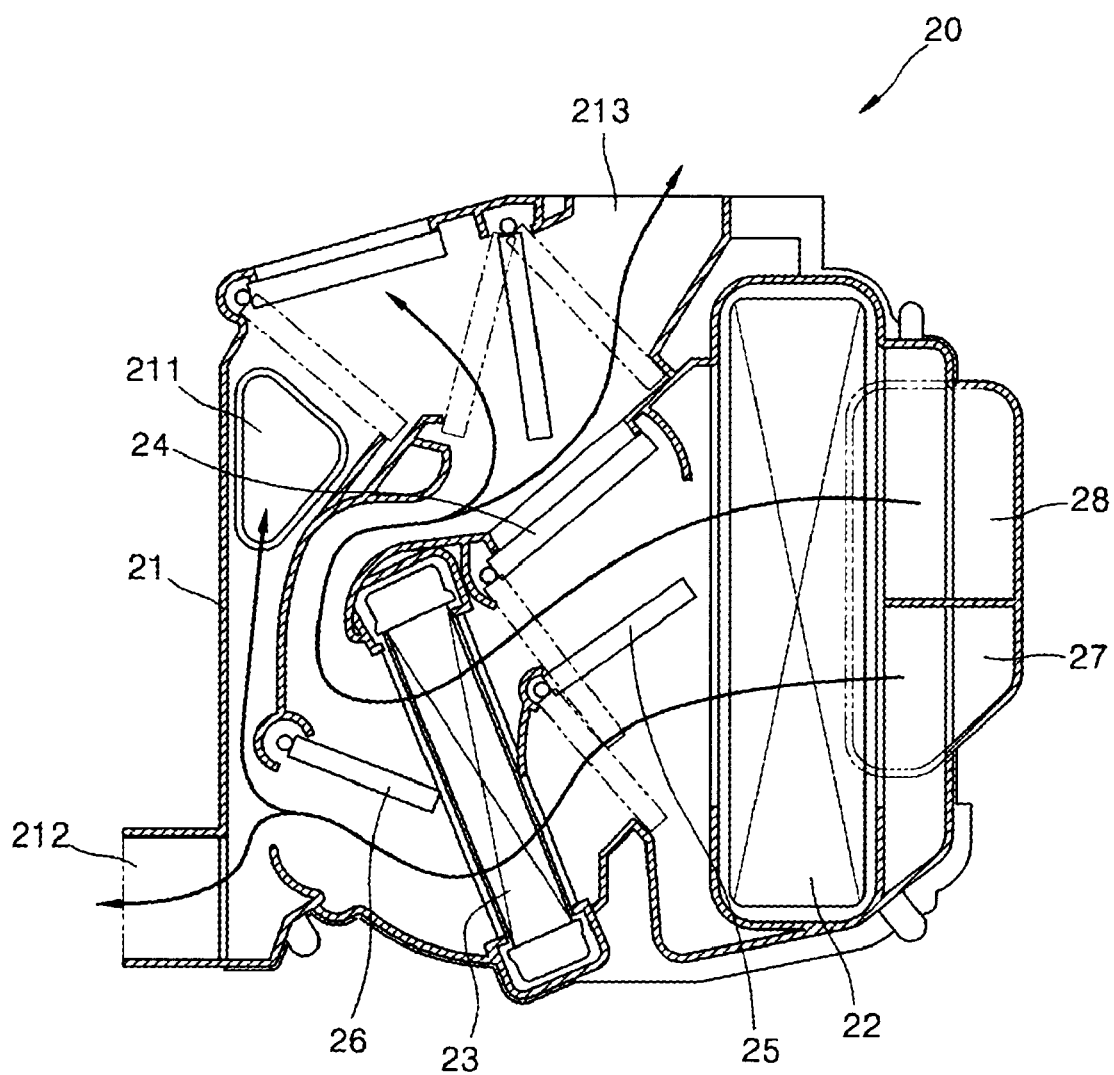
FIG. 2 is a sectional view illustrating another preferred embodiment of a conventional air conditioner.
Figure 3:
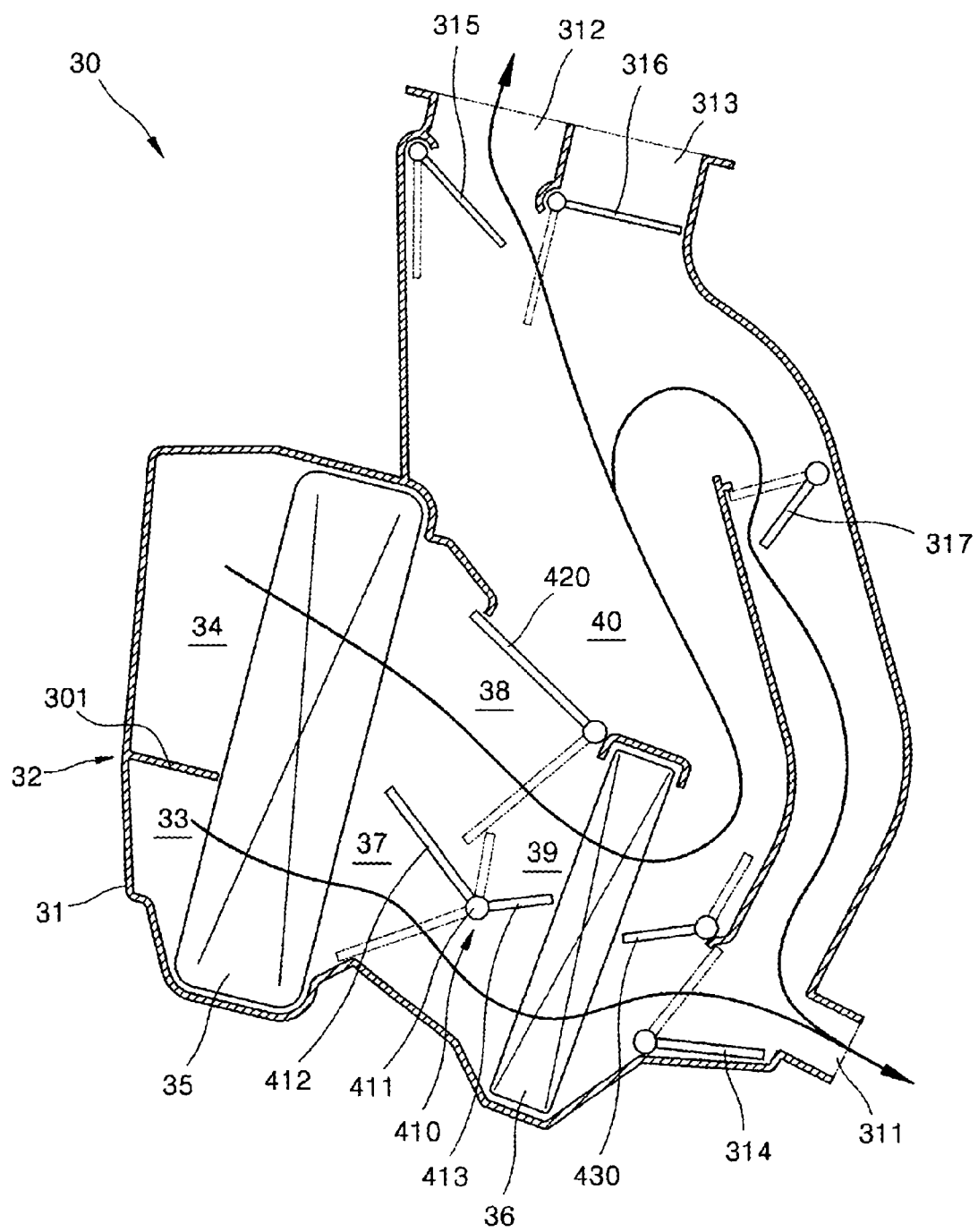
FIG. 3 is a sectional view showing a max warm-mix mode during a two layer air flow mode, as a heating state of an air conditioner according to a preferred embodiment of the present invention.

FIG. 3 shows an air conditioner 30 according to a preferred embodiment of the present invention. Referring to the drawing, the air conditioner 30 includes a case 31. An air inlet portion 32 through which a blowing air is input is formed at the case 31. First and second air paths 33 and 34 are formed at the air input portion 32. The first and second air paths 33 and 34 are sectioned by a separation wall 301. In an internal and external air two layer air flow mode, the internal air enters through the first air path 33 while the external air enters through the second air path 34.

A floor opening 311, a defrost opening 312, and a vent opening 313 are formed in the case 31 so that the air input through the first and second air paths 33 can 34 can be supplied to the respective areas inside a vehicle. A floor door 314, a defrost door 315, and a vent door 316 for selectively opening and closing the floor opening 311, the defrost opening 312, and the vent opening 313 according to each mode are installed at the floor opening 311, the defrost opening 312, and the vent opening 313, respectively.

An evaporator 35 is installed in the front side of the first and second air paths 33 and 34, to lower the temperature of air passing through the evaporator 35 through heat exchange so as to cool the inside of the vehicle. A heat core 36 is installed to the rear of the evaporator 35 to make the air in a high temperature state through heat exchange so as to heat the inside of the vehicle.

A first variable wall 410 is installed in a space between the rear side of the evaporator 35 and the front side of the heater core 36. The first variable wall 410 is disposed in the middle between the evaporator 35 and the heater core 36 to be capable of pivoting. The first variable wall 410 includes a rotation shaft 411 and first and second wall surfaces 412 and 413 installed in two different directions from the rotation shaft 411. The first variable wall 410 separates the air passing through the evaporator 35 into a two layer air flow, thus sectioning an internal air path 37 and an external air path 38, in a two layer air flow mode. In the other modes, the first variable wall 410 guides the air input through the paths 37 and 38 to a heated air path 39 in the front of the heater core 36.

A temp door 420 is installed above the first variable wall 410. The temp door 420 guides the air passing through the evaporator 35 to the heater core 36, adjusts a degree of opening/closing of the heater core 36 regardless of a varying position of the first variable wall 410, or control the temperature of the air to be blown by selectively blocking a cooled air path 40 bypassed the heater core 36.

A second variable wall 430 for separating the internal and external air passing through the heater core 36 into the upper and lower portions is installed to the rear of the heater core 36. The second variable wall 430 functions as a partition wall in the two layer air flow mode, together with the first variable wall 410, and as an internal wall of the case 31 in the other modes.

The floor door 314 is installed at the entrance of the floor opening 311 to selectively open/close a path through which the heated air passing through the heater core 36 is input to the floor opening 311. The floor door 314 is installed to operate by being interlinked with the first and second variable walls 410 and 430.

Figure 4:
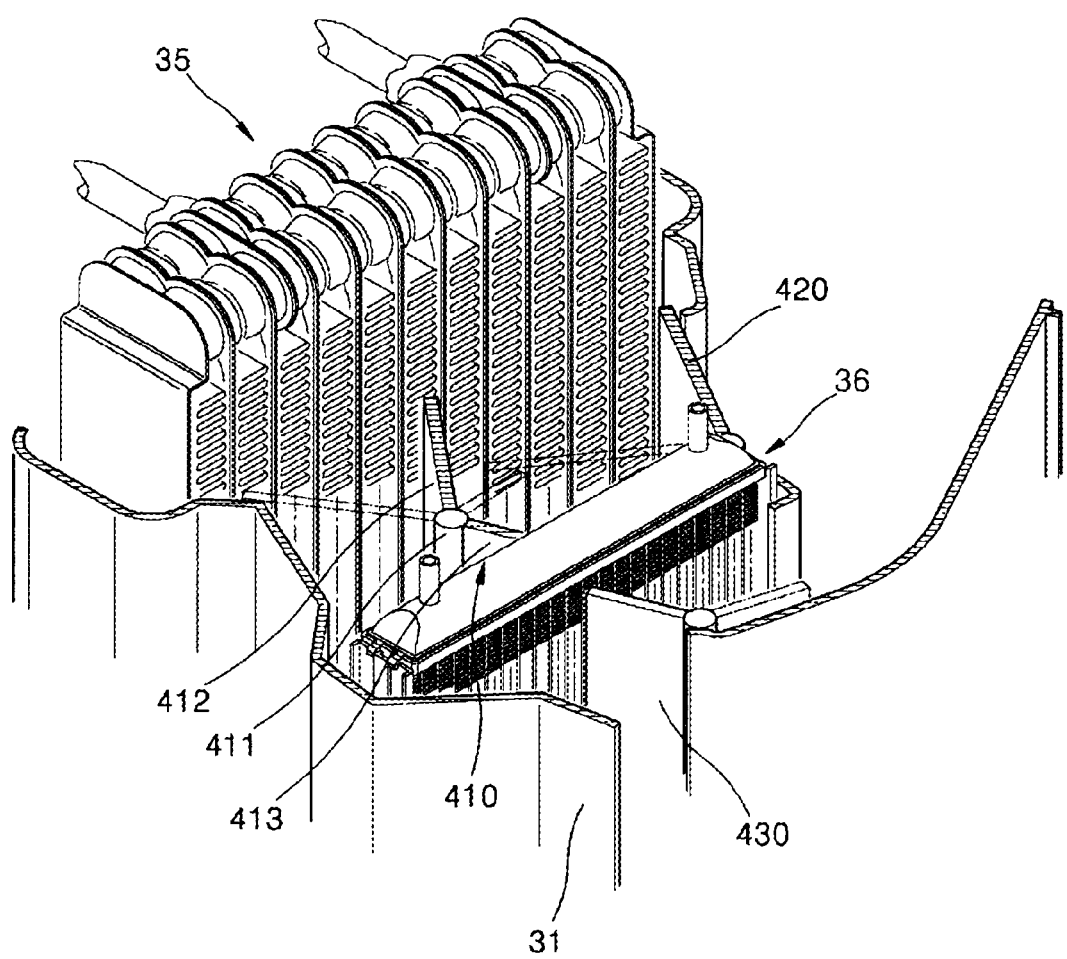
FIG. 4 is a perspective view illustrating major portions of FIG. 3.

FIG. 4 shows the major portions of FIG. 3. Referring to FIG. 4, the first variable wall 410 is disposed between the rear side of the evaporator 35 and the front side of the heater core 36. The first variable wall 410 has a rotation shaft 411 which is installed in the middle between the evaporator 35 and the heater core 36. The first wall surface 412 is coupled to the rotation shaft 411 toward the evaporator 35. The second wall surface 413 is coupled to the rotation shaft 411 toward the heater core 413. The first and second wall surfaces 412 and 413 are coupled to maintain an obtuse angle therebetween.

The first and second wall surfaces 412 and 413 are coupled to the rotation shaft 411 to be inclined by a predetermined angle. Also, the first and second wall surfaces 412 and 413 can rotate with respect to the rotation shaft 411. In the two layer air flow mode, the first variable wall 410 is disposed at the center of the rear side of the evaporator 35 and the second wall surface 413 is rotated to be disposed at the center of the front side of the heater core 36. Accordingly, the first variable wall 410 separates the internal and external air. In the other modes, the first wall surface 412 of the first variable wall 410 is disposed at the internal side wall of the case 31 and the second wall surface 413 is rotated to direct the evaporator 35. Thus, the first variable wall 410 guides air toward the heater core 36.

Also, the first variable wall 410 prevents dispersion of condensed water when the first variable wall 410 varies to a position closing part of the front side of the heater core 36. The shape of the first variable wall 410 can reduce space of the case 31. When functioning as a partition wall, the first variable wall 410 can closely contact the heater core 36, thus improving performance.

The temp door 420 is installed above the first variable wall 410. The temp door 420 rotates up and down between the evaporator 35 and the heater core 36 and adjust the temperature of the blowing air according to a degree of opening. The second variable wall 430 is installed to the rear of the heater core 36. The second variable wall 430 can be rotated by being interlinked with the first variable wall 410 to section the air passing through the heater core 36 into a two layer air flow of the internal and external air.

The operation of the air conditioner 30 having the above structure of the present invention according to the respective modes will now be described.

FIG. 3 shows the air conditioner 30 according to a preferred embodiment of the present invention, which is in a max warm-mix mode during the two layer air flow mode. Referring to the drawing, in the case 31, the floor opening 311 is completely opened by the floor door 314, the defrost opening 312 is partially opened by the defrost door 315, and the vent opening 313 is closed by the vent door 316. In the two layer air flow mode, the internal air is input through the first air path 33 and the external air is input through the second air path 34.

Here, the first variable wall 410 is rotated to be disposed approximately parallel to the flow of air input through the first and second air paths 33 and 34. That is, with respect to the rotation shaft 411, the first wall surface 412 is rotated to be disposed at the center of the rear side of the evaporator 35 and the second wall surface 413 is rotated to be disposed at the center of the front side of the heater core 36. Accordingly, the air input through the internal and external air outer paths 37 and 38 are separated into the internal and external air.

The second variable wall 430 is rotated to the center of the rear side of the heater core 36 to be disposed parallel to the flow of air by being interlinked with the first variable wall 410, so that the internal and external air can be supplied as a two layer air flow. Also, the temp door 420 disposed above the first variable wall 410 is disposed to completely close the upper front side of the evaporator 35 and blocks the cooled air path 40 which bypasses the heater core 36. The first and second variable walls 410 and 430 function as a partition wall separating the air paths 37 and 38 for the internal and external air.

Accordingly, after passing through the evaporator 35, the internal air in the first air path 33 is input to the lower portion of the heater core 36 via the internal air path 37 and then becomes heated air through heat exchange. After passing through the evaporator 35, the external air of the second air path 34 is input to the upper portion of the heater core 36 via the outer path 38 and then becomes heated air through heat exchange.

The air having performed heat exchange in the lower portion of the heater core 35 proceeds along the lower path separated by the second variable wall 430 and is discharged thorough the floor opening 311 opened by the floor door 314 toward the lower portion of the inside of the vehicle for heating. The air having performed heat exchange in the upper portion of the heater core 35 proceeds along the upper path separated by the second variable wall 430 and is discharged thorough the defrost opening 312 partially opened by the defrost door 315 toward a window glass of the vehicle. Here, part of the heated air proceeding toward the defrost opening 312 can be supplied to the floor opening 311 via an auxiliary floor door 317 to be mixed with the air discharged through the floor opening 311.

As described above, in the two layer air flow mode, since the fist and second variable walls 410 and 430 are linearly arranged in a direction approximately parallel to the flow of air, the internal and external air is separated into a two layer air flow and supplied to the inside of the vehicle so that both heating and defogging the inside the vehicle are performed.

Figure 5:
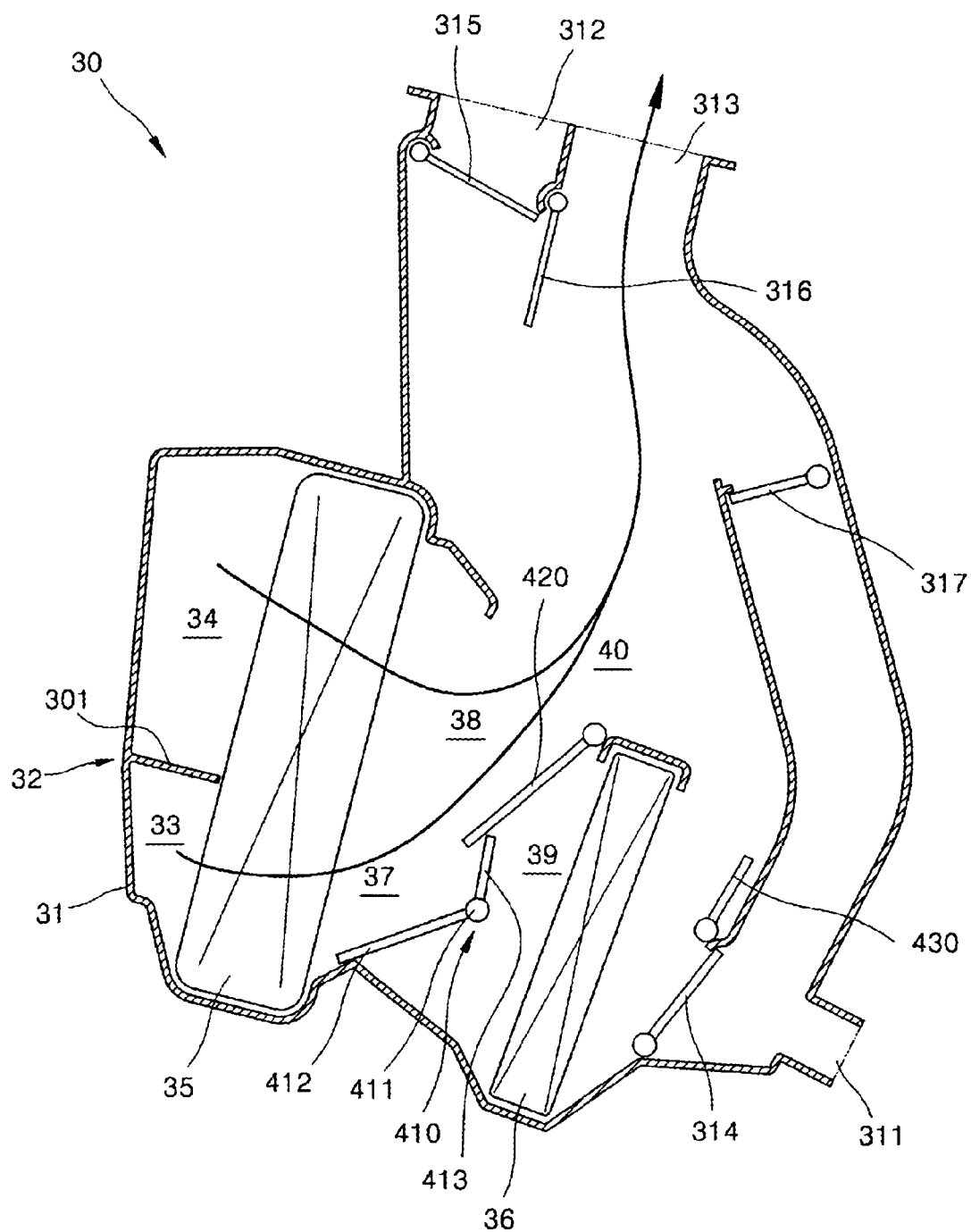
FIG. 5 is a sectional view showing a max cool mode, as a cooling state of the air conditioner of FIG. 3.

FIG. 5 is a sectional view showing a max cool mode, as a cooling state of the air conditioner 30 of FIG. 3. Hereinafter, the same reference numerals indicate the same members having the same functions. Referring to the drawing, in the case 31, the floor opening 311 is closed by the floor door 314 and the auxiliary floor door 317, the defrost opening 312 is closed by the defrost door 315, and the vent opening 313 is completely opened by the vent door 316.

In max cooling mode, the internal air is input through the first and second air paths 33 and 34. The first variable wall 410 rotates to close the heated air path 39 in the front of the heater core 36 and open the cooled air path 40. That is, the first variable wall 410 is rotated with respect to the rotation shaft 411 such that the first wall surface 412 is disposed close to the internal wall of the case 31 and the second wall surface 413 is disposed to face the evaporator 35. The temp door 420 is rotated to open the upper portion of the evaporator 35 and an end portion of the temp door 420 contacts one end of the second wall surface 413, so that the heated air path 39 is completely closed.

Accordingly, the air input through the first and second air paths 33 and 34 becomes through heat exchange as it passes through the upper and lower portions of the evaporator 35. The cooled air passes through the path 40 and is discharged through the vent opening 313 opened by the vent door 316, so that the inside of the vehicle is cooled.

Figure 6:
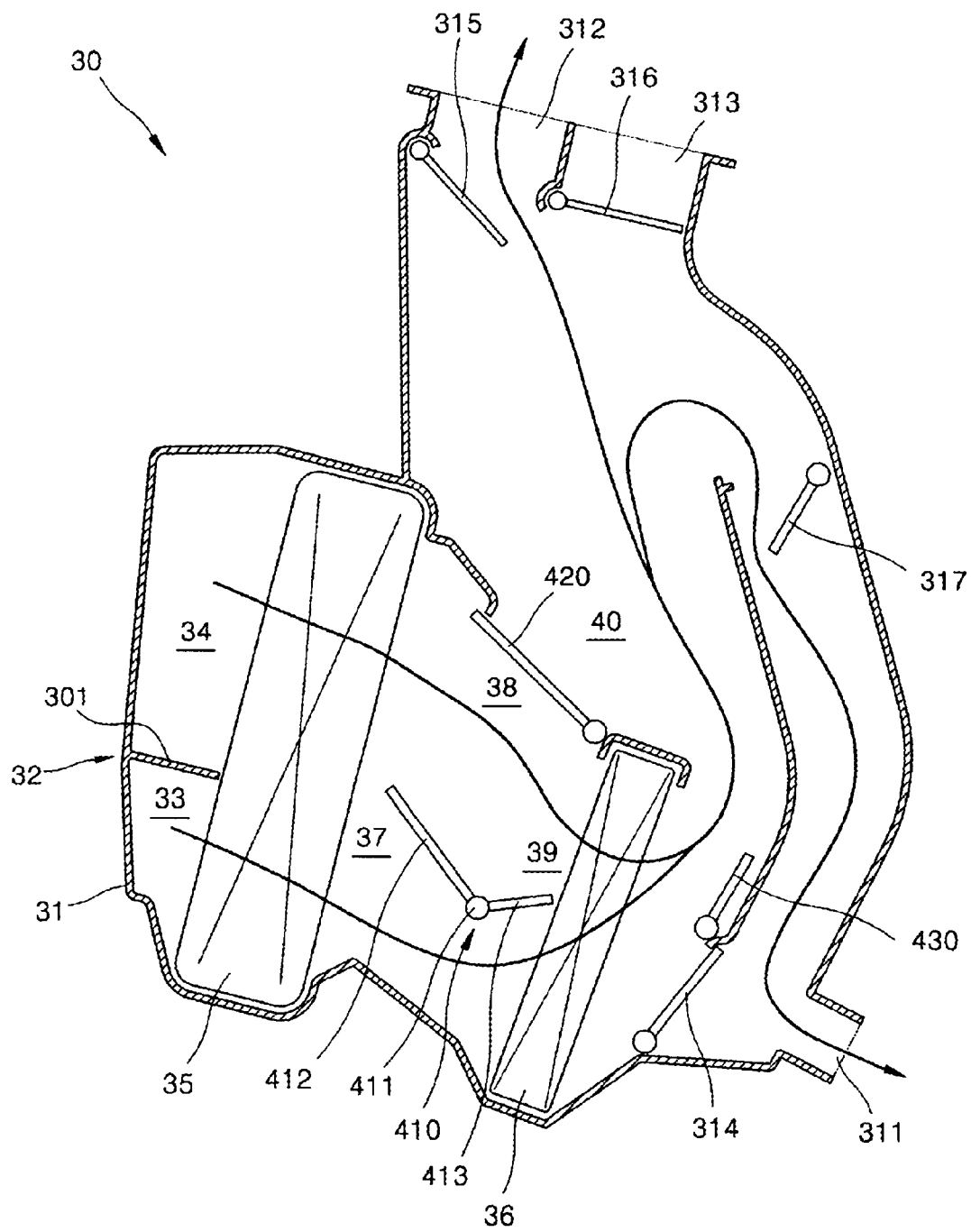
FIG. 6 is a sectional view showing a warm-mix mode, as a heating state of the air conditioner of FIG. 3.

FIG. 6 is a sectional view showing a warm-mix mode, as a heating state of the air conditioner 30 of FIG. 3. Referring to the drawing, in the case 31, the floor opening 311 is partially opened by the auxiliary floor door 317, the defrost opening 312 is partially opened by the defrost door 315, and the vent opening 313 is closed by the vent door 316.

The first variable wall 410 is rotated such that the first wall surface 412 is disposed close to the internal wall of the case 31 and the second wall surface 413 is disposed to face the evaporator 35. That is, the first variable wall 410 is rotated to close part of the front side of the heater core 36. The second variable wall 430 is rotated to open the path from the center of the rear side of the heater core 36 so that the heated air passing through the heater core 36 can proceed. The same time, the temp door 420 is rotated to close the upper portion of the front side of the evaporator 420 so as to block the cooled air path 40 bypassing the heater core 36.

Accordingly, the air input through the first and second air paths 33 and 34 becomes heated air through heat exchange by passing through the heated air path 39 opened by the first variable wall 410 and the temp door 420 and being input to the upper and lower portions of the heater core 36. Next, the heated air is supplied to the inside the vehicle through the floor opening 311 in which the auxiliary floor opening 317 is partially opened and the defrost opening 312 in which the defrost door 315 is partially opened, thus heating the inside of the vehicle.

Figure 7:
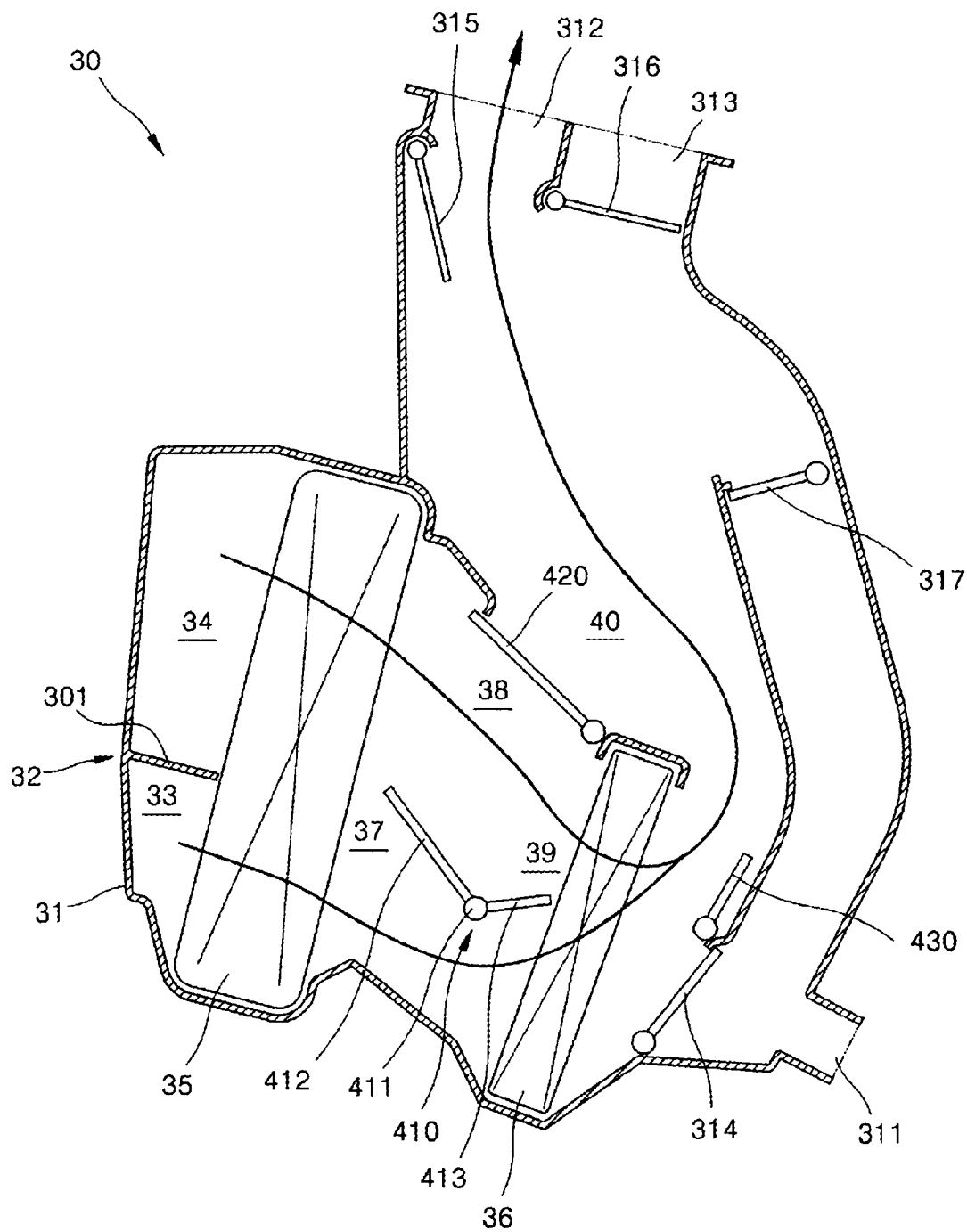
FIG. 7 is a sectional view showing a warm-defrost mode, as a heating state of the air conditioner of FIG. 3.

FIG. 7 is a sectional view showing a warm-defrost mode, as a heating state of the air conditioner 30 of FIG. 3. Referring to the drawing, in the case 31, the floor opening 311 is closed by the floor door 314 and the auxiliary floor door 317, the defrost opening 312 is completely opened by the defrost door 315, and the vent opening 313 is closed by the vent door 316. For the maximum heating defrost mode, the other exits are closed and only the defrost opening 312 is completely opened.

In this case, the external air is input through the first and second air paths 33 and 34. The first variable wall 410 is rotated such that the first wall surface 412 is disposed close to the internal wall of the case 31 and the second wall surface 413 is disposed to face the evaporator 35. Accordingly, the air input through the first and second air paths 33 and 34 can be smoothly input. Here, the second variable wall 430 is rotated to open the path. The same time, the temp door 420 is rotated to close the upper portion of the evaporator 420 so as to block the cooled air path 40 bypassing the heater core 36.

Accordingly, the external air input through the first and second air paths 33 and 34 becomes heated air through heat exchange by passing through the heated air path 39 in a state in which a heating space is secured by the first variable wall 410 and being input to the upper and lower portions of the heater core 36. The heated air is supplied toward the glass portion of the vehicle through the defrost 312 which is completely opened by the defrost door 315.

Figure 8:
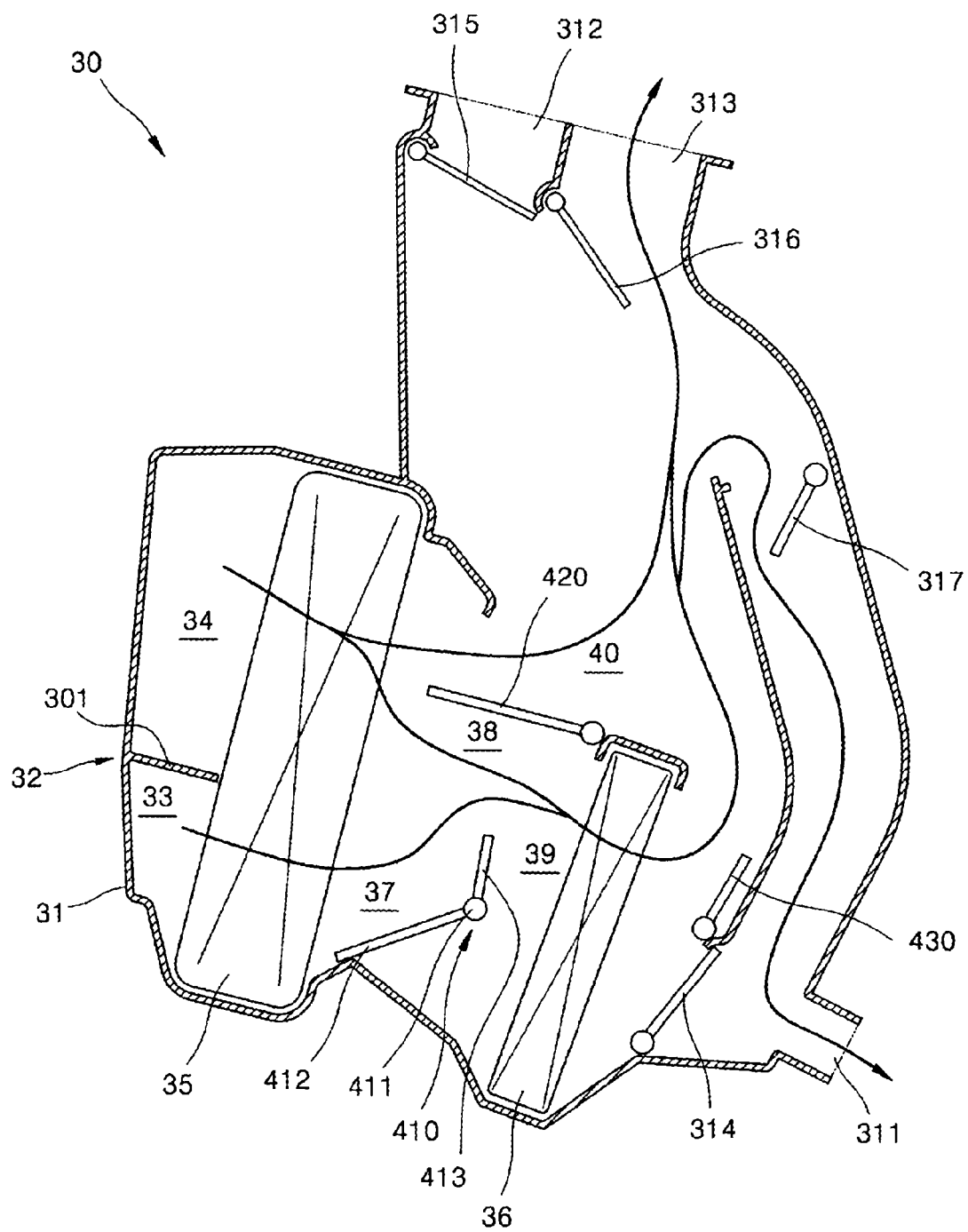
FIG. 8 is a sectional view showing a bi-level mode, as a heating state of the air conditioner of FIG. 3.

FIG. 8 is a sectional view showing a bi-level mode, as a heating state of the air conditioner 30 of FIG. 3. Referring to the drawing, in the case 31, the floor opening 311 is partially opened by the auxiliary floor door 317, the defrost opening 312 is completely opened by the defrost door 315, and the vent opening 313 is partially closed by the vent door 316. In the bi-level mode, the entire internal air or the entire external air is input through the first and second air paths 33 and 34.

The first variable wall 410 is rotated such that the first wall surface 412 is disposed close to the internal wall of the case 31 and the second wall surface 413 is disposed to face the evaporator 35. Here, the second variable wall 430 is rotated to open the path. The temp door 420 is rotated at a middle position between the maximum heating position and the maximum cooling position.

Accordingly, the cold air passing through the evaporator 35 and the heated air passing through the heater core 36 are mixed and discharged through the vent opening 313 in which the vent door 316 is partially open. Also, the mixed air of the hot air and the cold air is supplied through the floor opening 311 in which the auxiliary floor door 317 is partially open. Accordingly, the temp door 420 can adjust the temperature of the air passing through the evaporator 35 by opening and closing part of the front side of the heater core 36.

Figure 9:
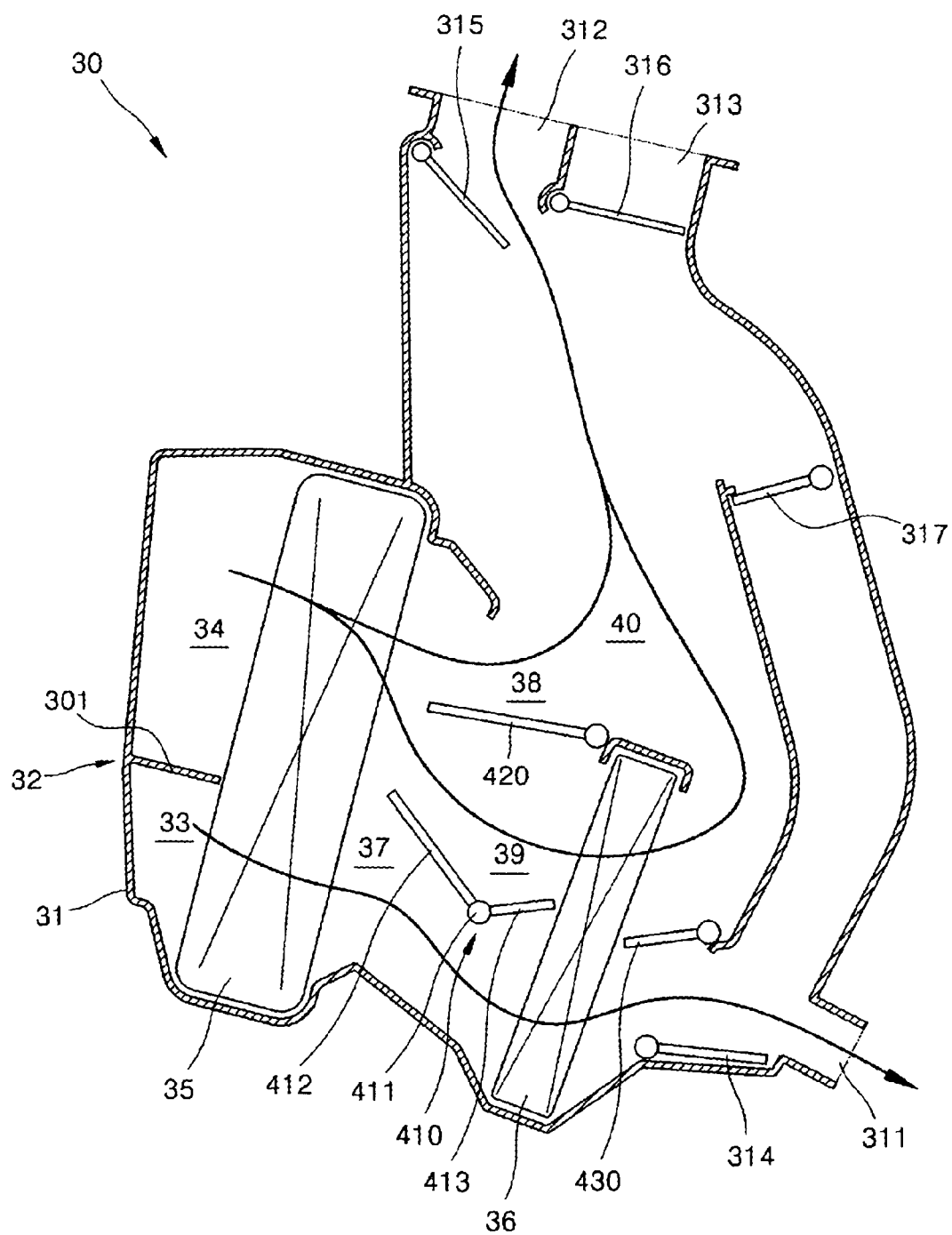
FIG. 9 is a sectional view showing a ½ warm-mix mode during the two layer air flow mode, as a heating state of the air conditioner of FIG. 3.

FIG. 9 shows the air conditioner 30 of FIG. 3, which is in a ½ warm-mix mode during the two layer air flow mode. Referring to the drawing, in the case 31, the floor opening 311 is completely opened by the floor door 314, the auxiliary floor door 317 closes the path, the defrost opening 312 is partially opened by the defrost door 315, and the vent opening 313 is closed by the vent door 316. In the two layer air flow mode, the internal air is input through the first air path 33 and the external air is input through the second air path 34.

Here, the first variable wall 410 is rotated to be disposed approximately parallel to the flow of air input through the first and second air paths 33 and 34. That is, with respect to the rotation shaft 411, the first wall surface 412 is rotated to be disposed at the center of the rear side of the evaporator 35 and the second wall surface 413 is rotated to be disposed at the center of the front side of the heater core 36. Accordingly, the air input through the internal and external paths 37 and 38 are separated into the internal and external air.

The second variable wall 430 is rotated to the center of the rear side of the heater core 36 to be disposed parallel to the flow of air by being interlinked with the first variable wall 410, so that the internal and external air can be supplied as a two layer air flow. The first and second variable walls 410 and 430 function as a partition wall separating the air paths 37 and 38 for the internal and external air. Also, the temp door 420 disposed above the first variable wall 410 opens by ½ the cooled air path 40 bypassing the heater core 36 to be disposed at the middle position between the maximum heating position and the maximum cooling position.

Accordingly, after passing through the evaporator 35, the internal air in the first air path 33 is input to the lower portion of the heater core 36 via the internal air path 37 and then becomes heated air through heat exchange. After passing through the evaporator 35, ½ of the external air of the second air path 34 is input to the upper portion of the heater core 36 via the outer path 38 and then becomes heated air through heat exchange. The remaining ½ of the external air of the second air path 34 passes through the evaporator 35 and proceeds toward the cooled air path 40 bypassing the heater core 36.

The air having performed heat exchange in the lower portion of the heater core 35 proceeds along the lower path separated by the second variable wall 430 and is discharged thorough the floor opening 311 opened by the floor door 314 toward the lower portion of the inside of the vehicle for heating. The air having performed heat exchange in the upper portion of the heater core 35 proceeds along the upper path separated by the second variable wall 430 and is discharged thorough the defrost opening 312 partially opened by the defrost door 315 toward the glass portion of the vehicle. Here, air having performed heat exchange in the upper portion of the heater core 35 is mixed with the air passing through the cooled air path 40 bypassing the heater core 36 and proceeds toward the defrost opening 32.

As described above, a variety of modes can be set by appropriately opening and closing the first and second variable walls 410 and 430 and the temp door 420.

As described above, the air conditioner for a vehicle according to the present invention provides the following effects.

First, since the first variable wall and the temp door are installed between the evaporator and the heater core and the second variable wall is installed to the rear of the heater core, the function of a separation wall in the two layer air flow mode and the function of a case internal wall in the other modes can be selected so that the structure of the apparatus is simplified.

Second, the first variable wall can separate the rear side of the evaporator and the front side of the heater core at the same time. Simultaneously, the second variable wall rotates to separate the exit of the heater core in the two layer air flow mode.

Third, since the first variable wall can be rotated selectively, dispersion of condensed water from the evaporator to the heater core can be prevented in advance.

Fourth, when the first variable wall functions as the internal wall of the case, a space is secured in the rear side of the first variable wall and the front side of the heater core so that the amount of wind moving toward the heater core is increased.

Fifth, since the first variable wall includes the rotation shaft and the wall surfaces coupled to the rotation shaft, when the temp door rotated downward, the first variable wall function as a stopper to the temp door.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An air conditioner for a vehicle comprising:
   a case in which a plurality of air paths separated by a separation wall is formed at an end portion of a body, a defrost opening, a vent opening, and a floor opening are formed to supply the air input through the air paths to areas of the inside of the vehicle, and the defrost opening, the vent opening, and the floor opening are selectively open or closed by doors according to a mode;
   an evaporator installed at an entrance of the air paths to perform heat exchange to make the air passing through the evaporator in a low temperature state so as to cool the inside of the vehicle;
   a heater core installed at the rear side of the evaporator to perform heat exchange to make the air passing through the heater core in a hot temperature state so as to heat the inside of the vehicle;
   a first variable wall installed between the evaporator and the heater core to separate the air paths into upper and lower portions, or connect the separated air paths, and open or close a heated air path of the heater core;
   a temp door installed at the upper portion of the first variable wall between the evaporator and the heater core to adjust a degree of opening or closing of a cooled air path bypassing the heater core; and
   a second variable wall installed at the rear side of the heater core to separate the air passing through the heater core into upper and lower portions or connect the separated air paths,
   wherein the first variable wall and the temp door are independently controlled so that a path of the air passing through the evaporator can be varied.

2. The apparatus as claimed in claim 1, wherein the first variable wall comprises first and second wall surfaces which are inclined at predetermined angles with respect to a rotation shaft installed between a rear side of the evaporator and a front side of the heater core.

3. The apparatus as claimed in claim 1, wherein a mode of the first variable wall comprises a mode in which a partition wall is formed to separate the air paths for internal and external air into upper and lower portions between the rear side of the evaporator and the front side of the heater core, and a mode in which the air input along the air paths is prevented from being directly supplied to the heater core and simultaneously guiding the supply.

4. The apparatus as claimed in claim 1, wherein a floor door is installed at the rear side of the heater core and is opened or closed to control the amount of the heated air passing through the heater core to be discharged through the floor opening.

5. The apparatus as claimed in claim 1, wherein, in a two layer air flow mode, the first and second variable walls are set to rotate approximately parallel to a direction in which air flows and the air paths to the rear side of the evaporator is separated into upper and lower layers.

6. The apparatus as claimed in claim 1, wherein, in a heating mode, the first variable wall is set to rotate to close part of the front side of the heater core and the second variable wall is set to rotate to open the rear side of the heater core.

7. The apparatus as claimed in claim 1, wherein, in the maximum cooling mode, the second wall surface of the first variable wall is set to perform a stopper function of a temp door rotated to open the cooled air path at its maximum.

8. The apparatus as claimed in claim 1, wherein, in a ½ warm-mix mode to supply a two layer air flow, the first and second variable walls are set to rotate to separate the air path at the rear side of the evaporator into a two layer of upper and lower portions, and the temp door is set to rotate to open the cooled air path by ½.

9. The apparatus as claimed in claim 1, wherein the temp door is set to control the air passing through the evaporator by selectively controlling the amount of opening of the air path at the front side of the heater core regardless of the varying position of the first variable wall.

10. The apparatus as claimed in claim 1, wherein the first variable wall, the second variable wall, and the floor door are set to operate by being interlinked with one another.

11. The apparatus as claimed in claim 1, wherein the first and second variable wall surfaces of the first variable wall are maintained at an obtuse angle.

* * * * *